(12) United States Patent
Yoshida et al.

(10) Patent No.: US 7,032,701 B2
(45) Date of Patent: Apr. 25, 2006

(54) VEHICLE POWER SOURCE SUPPORTING STRUCTURE

(75) Inventors: Hiroyuki Yoshida, Wako (JP); Kazuo Miyagawa, Wako (JP); Hideki Kami, Wako (JP); Satoshi Watanabe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/648,133

(22) Filed: Aug. 26, 2003

(65) Prior Publication Data

US 2004/0046450 A1    Mar. 11, 2004

(30) Foreign Application Priority Data

Sep. 6, 2002  (JP) .............................. 2002-262001
Oct. 11, 2002 (JP) .............................. 2002-298997

(51) Int. Cl.
*B60K 1/00*  (2006.01)
(52) U.S. Cl. ..................... 180/291; 180/299; 180/312
(58) Field of Classification Search ................ 180/291, 180/299, 295, 312; 248/646; 123/195 R, 123/195 P, 195
See application file for complete search history.

(56) References Cited

U.S. PATENT DOCUMENTS 4,779,853 A * 10/1988 Sugino et al. ......... 267/140.11

| | | | |
|---|---|---|---|
| 5,129,479 A | * | 7/1992 | Fujii et al. .................. 180/297 |
| 5,335,745 A | * | 8/1994 | Goor .......................... 180/232 |
| 6,386,309 B1 | * | 5/2002 | Park ........................... 180/300 |

FOREIGN PATENT DOCUMENTS

| JP | 59-040946 | | 3/1984 |
|---|---|---|---|
| JP | 3-182837 | * | 8/1991 |
| JP | 6-87333 | * | 3/1994 |
| JP | 9-20150 | * | 1/1997 |
| JP | 9-226384 | * | 9/1997 |
| JP | 9-226386 | | 9/1997 |
| JP | 9-228846 | * | 9/1997 |
| JP | 2004-150546 | * | 5/2004 |

* cited by examiner

*Primary Examiner*—Christopher P. Ellis
*Assistant Examiner*—Brian Swenson
(74) *Attorney, Agent, or Firm*—Hamre, Schumann, Mueller & Larson, P.C.

(57) ABSTRACT

A supporting structure of a vehicle power source consists of a plurality of mount members having elasticity through which a power source is mounted on a vehicle body; first mount members for primarily sharing the weight of the power source and at least one of the first mount members, which is supported by the vehicle body at a first height lower than the height of a gravity center of the power source, is attached to a sub-frame; and second mount members for secondarily sharing the weight of the power source and the second mount members, which are attached to the vehicle body at a second height higher than the gravity center of the power source. A height of a center of elasticity of the supporting structure defined by the first and second mount members is set to be higher than a height of the gravity center of the power source.

3 Claims, 4 Drawing Sheets

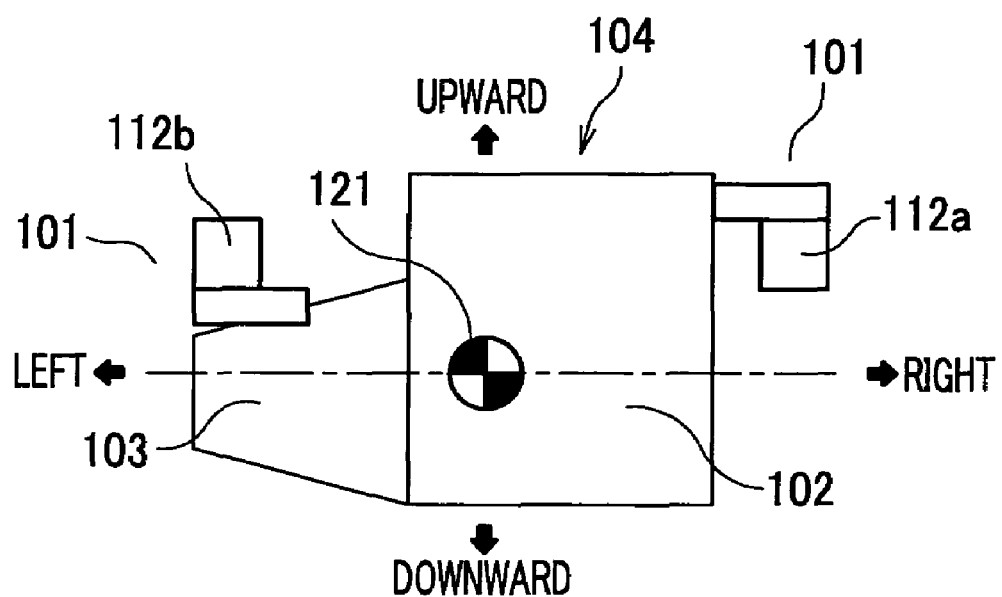

VEHICLE POWER SOURCE SUPPORTING STRUCTURE

FIELD OF THE INVENTION

The present invention relates to a supporting structure of a vehicle power source used for a vehicle body support of a vehicle power source through a plurality of mount members with elasticity.

BACKGROUND OF THE INVENTION

Conventionally, there is a supporting structure for a vehicle power source used in a vehicle body. Such supporting structure types include a gravity center mount type of supporting structure and an inertia bearing main shaft type of supporting structure.

The gravity center mount type is a type in which a center of elasticity is created through mounts, and is substantially accorded with a gravity center of the supporting structure. In this configuration, an engine and transmission are visually placed and held on the mounts, which are provided on frame members such as a sub-frame.

When the engine is lengthwise disposed, the center of elasticity created by the mounts is set higher than the gravity center of the engine in many cases by tilting mounts disposed at right and left near the gravity center.

An inertia bearing main shaft type includes a plurality of mount members consisting of a front stopper disposed at a front side of an engine, a rear stopper disposed at a back side of the engine, a side engine mount disposed at a side end of the engine, and a transmission mount disposed at a side end of the transmission (for example, refer to Japan patent publication 63-55453).

Here, the front and rear stoppers are secondary weight sharing mount members which do not mainly share the weight of the engine and transmission being a power source.

On the other hand, the side engine mount and transmission mount are primary weight sharing mount members which mainly share the weight of the engine and transmission.

FIG. 1 is a rear view showing a general configuration of a conventional inertia bearing main shaft type of supporting structure. As shown in FIG. 1, although the inertia bearing main shaft type is generally a type of supporting structure which holds the vicinity of a torque roll shaft, mount members 101 are in many cases disposed on a side frame or at its side in the case of a layout in which an engine 102 is laterally disposed. A position of a gravity center 121 in a power source 104 which is a connected body of the engine 102 and a transmission 103 is mostly located under the side frame. Therefore, positions of a side engine mount 112a and transmission mount 112b at both sides of the power source 104 are located above the gravity center of the power source 104 in many cases. Accordingly, a center of elasticity created by the mounts is higher than the gravity center 121 in many cases.

In the gravity center mount type of supporting structure, however, the supporting structure is a type in which the engine and transmission are placed and held on mounts provided on frame members such as the sub-frame, so that the center of elasticity formed by the mounts easily becomes lower than the gravity center consisting of the engine and transmission. Therefore, the power source easily rolls and/or pitches according to movements of a vehicle.

Moreover, there is a problem that a passenger easily experiences a roll/pitch feeling of the power source and cannot get a sense of unity between the power source and vehicle body and so a sufficient drive-safety/ride-quality feeling cannot be obtained.

On the other hand, in a conventional inertia bearing main shaft type of supporting structure shown in FIG. 1, the mount members 101 are disposed on the side frame or at its side. In this configuration, it is difficult to adopt a double vibration isolation structure such that mount members 101 are placed and held on the side frame and elastically supported by a vehicle body frame, compared to the gravity center mount type of supporting structure. Moreover, there is a problem that routes from the side engine mount 112a and transmission mount 112b at both sides to a cabin are short, so a sound and vibration which cannot be completely shut off by the mount members 101 are easily transmitted to a passenger.

SUMMARY OF THE INVENTION

The main problem of the present invention is to provide the supporting structure of a vehicle power source in which a vibration feeling in the front/rear direction (hereinafter referred to as longitudinal direction) as well as in the right/left direction (hereinafter referred to as lateral direction) of a vehicle body can be eliminated so as to surely and sufficiently obtain a drive-safety/ride-quality feeling.

The supporting structure related to the invention is used for the support to the vehicle body of the vehicle power source through a plurality of mount members having elasticity.

The plurality of mount members consist of the primary weight sharing mount members and secondary weight sharing mount members.

Here, at least one of the primary weight sharing mount members is attached at a lower position than a height of a gravity center of a power source to a sub-frame that is elastically supported by a vehicle body and carries out a function mainly sharing the weight of the power source.

On the other hand, the secondary weight sharing mount members have at least one directional spring component of longitudinal and lateral directions of the vehicle body, are attached to the vehicle body at a higher position than the height of the gravity center of the power source and do not mainly share the weight of the power source.

Furthermore, a height of a center of elasticity as a whole and created by the position of the mount members is set at a higher position than that of the gravity center of the power source.

Because the height of the center of elasticity, created by the plurality of mount members consisting of the primary and secondary weight sharing mount members as a whole, is set at a higher position than the height of the gravity center of the power source, the supporting structure enables vibration feelings in the longitudinal direction as well as in the lateral direction of the vehicle body to be eliminated.

Accordingly, the supporting structure enables a vibration isolation effect and a drive-safety/ride-quality feeling with a sense of unity between the power source and vehicle body to be surely and sufficiently obtained.

In the secondary weight sharing mount members, the spring component elasticity of an upward/downward (vertical) direction is set to be softer than that of the longitudinal or lateral direction.

According to such a supporting structure, in the secondary weight sharing mount members elastically supporting both sides of the power source, the spring component elasticity of the vertical direction is set softer (a lower spring constant)

and that of the longitudinal or lateral direction is set more rigid (a higher spring constant). Thus, the secondary weight sharing mount members make it difficult for a passenger to experience a vibration, where the roll/pitch of a driving source and a vibration transmission from body side frames can be curbed.

The sub-frame is supported under the body side frames through sub-frame support mounts with bolts and buffer members.

According to such supporting structure, the sub-frame is elastically supported to the body side frames by the sub-frame support mounts. Thus, the driving source, including the engine and transmission, is double-elastically supported (double vibration isolation) by the primary weight sharing mounts and sub-frame support mounts.

Moreover, because the sub-frame is supported under the body side frames through the sub-frame support mounts, it breaks up, falls downward from the body side frames, and separates in the case of a vehicle collision. Therefore, a passenger compartment of a vehicle may go over the power source in the case of the vehicle collision, so it can be prevented from being crushed by the driving source.

BRIEF DESCRIPTION OF THE DRAWINGS

FIG. 1 is a rear view showing a general configuration of supporting structure of a vehicle power source in a conventional embodiment example.

FIG. 4A is a cross-section view showing a supporting structure of a sub-frame support mount at the front and back sides of a sub-frame in one embodiment of the invention.

FIG. 4B is a cross-section view showing a supporting structure of another embodiment of a sub-frame support mount in between a sub-frame.

DESCRIPTION OF THE PREFERRED EMBODIMENTS

One preferred embodiment of the invention will be described in detail hereinafter with reference to the accompanying drawings.

a. Supporting Structure of Vehicle Power Source

Figure 2A:
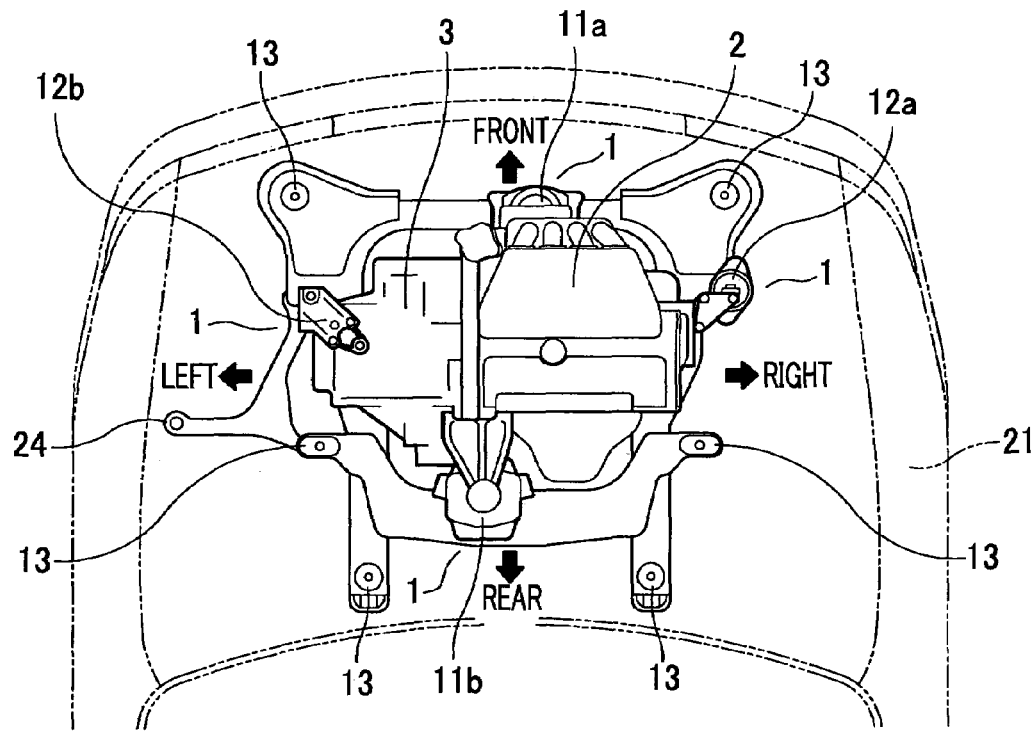
FIG. 2A is a plan view of a supporting structure showing a general configuration of a vehicle power source related to one embodiment of the invention.
Figure 2B:
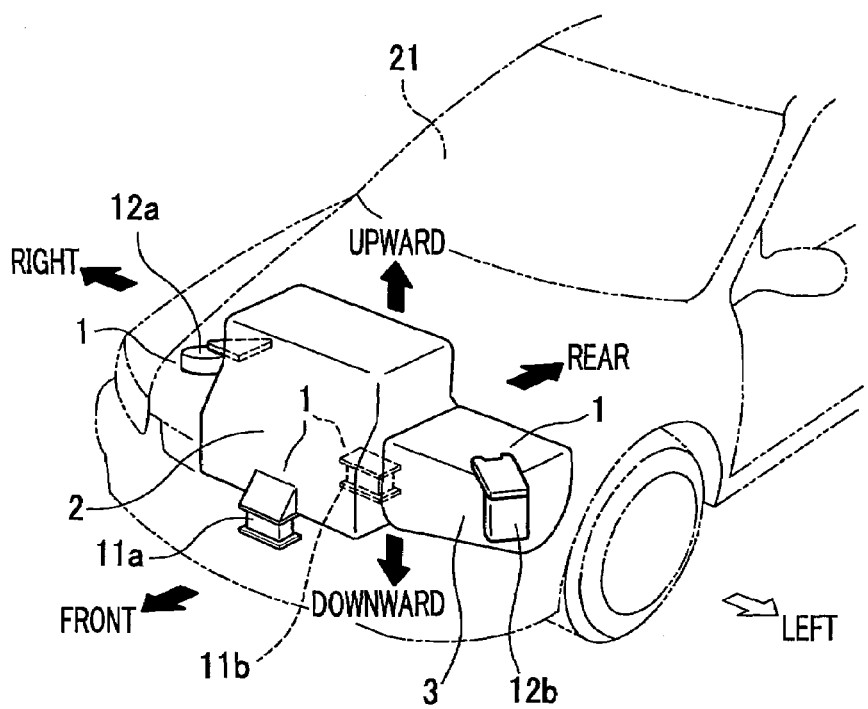
FIG. 2B is a perspective view showing a general configuration of supporting structure of a vehicle power source related to one embodiment of the invention.

FIGS. 2A and 2B are a plan view and perspective view showing a general configuration of the supporting structure related to one embodiment of the invention, respectively.

Figure 3A:
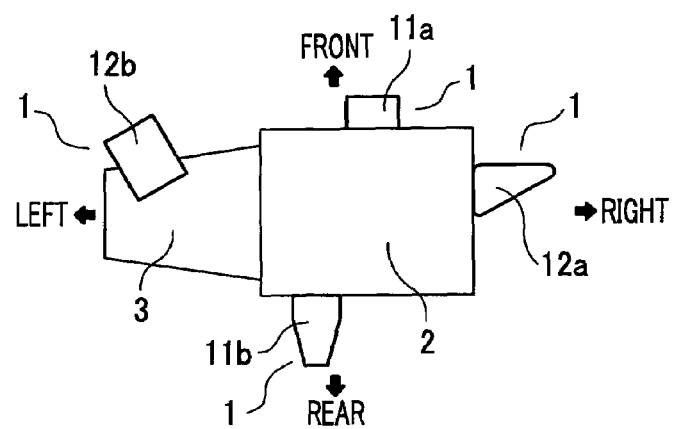
FIG. 3A is a plan view showing a schematic configuration of supporting structure of a vehicle power source related to one embodiment of the invention.
Figure 3B:
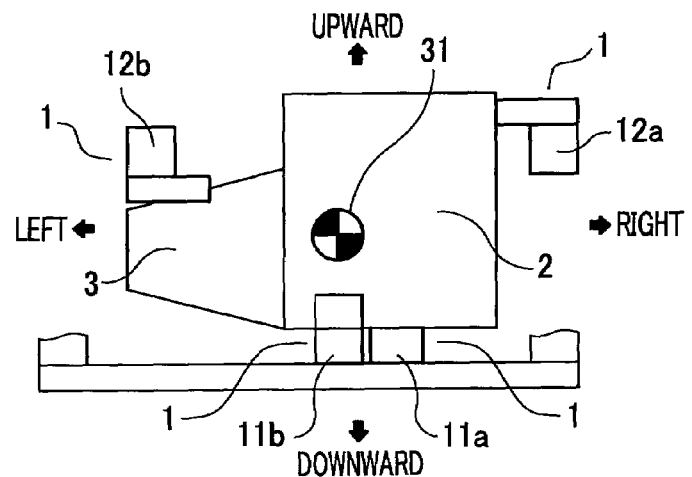
FIG. 3B is a rear view showing a schematic configuration of supporting structure of a vehicle power source related to one embodiment of the invention.
Figure 3C:
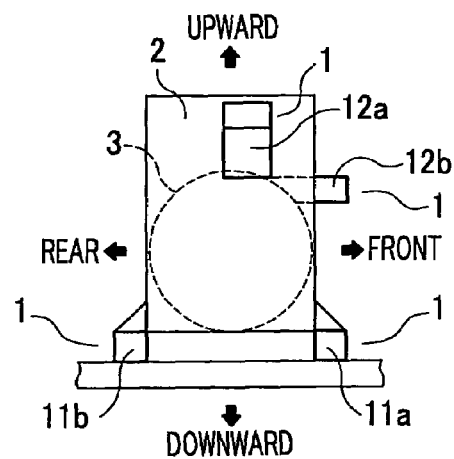
FIG. 3C is a side view showing a schematic configuration of supporting structure of a vehicle power source related to one embodiment of the invention.

FIGS. 3A, 3B, and 3C are a plan view, rear view, and side view showing a schematic configuration of the supporting structure related to embodiment of the invention, respectively.

In the embodiment illustrated, the supporting structure is designed to be used for the support of an engine 2 which is the vehicle power source to a vehicle body 21 through a plurality of mount members 1 having elasticity so that the engine is elastically supported by the vehicle body.

Here, the engine 2 is designed so that a transmission 3 is connected to one end of its crank shaft (not shown in any drawing) and the crank shaft is laterally disposed for the vehicle body 21.

Such the plurality of the mount members 1 are designed to consist of primary weight sharing mount members and secondary weight sharing mount members.

These respective mount members will be described hereinafter in more detail.

b. Primary Weight Sharing Mount Members

The primary weight sharing mount members are designed to be attached at lower positions than a height of a gravity center 31 in the engine 2 to sub-frames 22 elastically supported to the vehicle body 21, and they mainly play a role of sharing the weight of the engine 2.

Concretely, these mount members are designed to consist of a front mount 11a disposed at a rear side of the engine 2 and a front mount 11b disposed at a back side of the engine 2 and a trans-lower mount (not shown in any drawing).

Through the front mount 11a, rear mount 11b, and transmount, the engine 2 is designed to be elastically supported at the sub-frame 22, which is supported by body side frames 23 through sub-frame support mounts 13 (see FIGS. 4A and 4B).

Meanwhile, FIGS. 4A and 4B are cross-section drawings showing a supporting structure provided between the body side frames 23 and sub-frame 22, FIG. 4A is a drawing showing the sub-frame support mount 13 disposed at the front and back sides of the sub-frame 22, and FIG. 4B is a drawing showing the sub-frame support mount 13 disposed in between the sub-frame 22. In FIG. 4A, the sub-frame 22 is supported by the body side frames 23 through the sub-frame support mount 13 having a bolt 13a and buffer rubber 13b. Although the supporting structure is also nearly same in FIG. 4B, a bracket 13c is provided in between the body frame 23 and sub-frame 22 different from FIG. 4A.

The front mount 11a, rear mount 11b, and trans-lower mount are designed to be disposed on the sub-frame 22 which is provided to support a lower arm 24 of a suspension.

The sub-frame 22, as described before, is floatingly supported under the body side frames 23 of the vehicle body 21, and a height of a center of elasticity composed of the front mount 11a, rear mount 11b, and trans-lower mount is designed to be set at a lower position than a height of the gravity center 31 in the engine 2.

In fact, the front mount 11a, rear mount 11b, and trans-lower mount primarily support the weight of the engine 2. The primary weight sharing mount members enable a vibration transmission of a vehicle body to be minimized, because the mount members are disposed on the sub-frame and are floatingly supported through the sub-frame support mounts 13 for the vehicle body 21, and an engine vibration is double-isolated notwithstanding having a relatively high spring.

c. Secondary Weight Sharing Mount Members

The secondary weight sharing mount members have at least one of longitudinal directional and lateral directional spring components and are designed to be attached to the vehicle body 21 at a higher position than the height of the gravity center 31 in the engine 2.

The secondary weight sharing mount members are designed not to mainly share the weight of the engine 2, and are different from the primary weight sharing mount members.

Concretely, the secondary weight sharing mount members are designed to consist of a side engine mount 12a which is disposed at a right side of the engine 2 and at an end opposite to the transmission 3 of the engine 2 and a trans-upper mount 12b which is disposed at a left side of the engine 2 and on the transmission 3 of the engine 2.

That is, through these side engine mount 12a and trans-upper mount 12b, the engine 2 is designed to be supported by the body side frames 23.

The side engine mount 12a and trans-upper mount 12b are designed to be disposed at a higher position than the height of the gravity center 31 in the engine 2.

Therefore, a height of a center of elasticity composed of the side engine mount 12a and trans-upper mount 12b is designed to be set at a higher position than the height of the gravity center 31 in the engine 2.

Figure 5A:
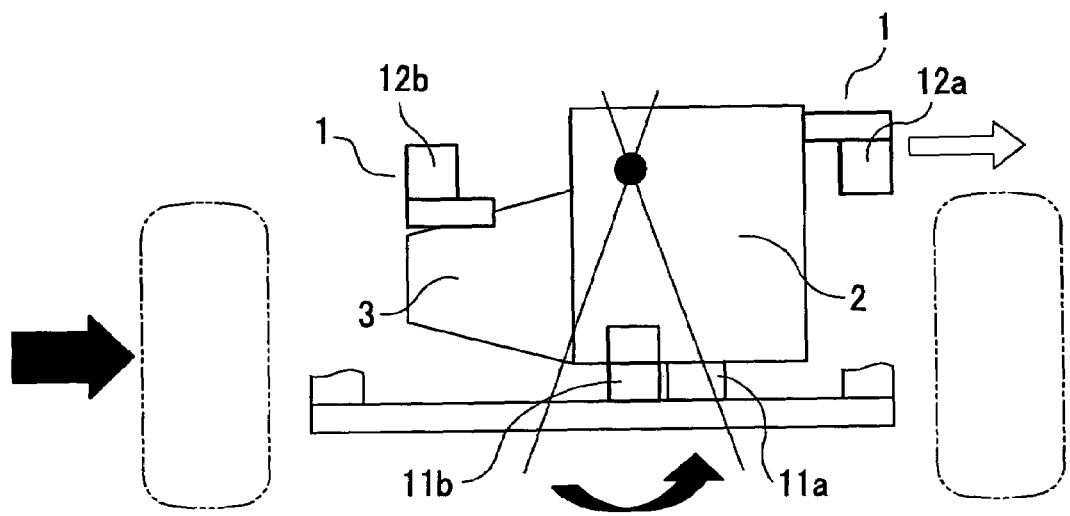
FIG. 5A is a rear view illustrating a performance of a supporting structure of a vehicle power source related to one embodiment of the invention.
Figure 5B:
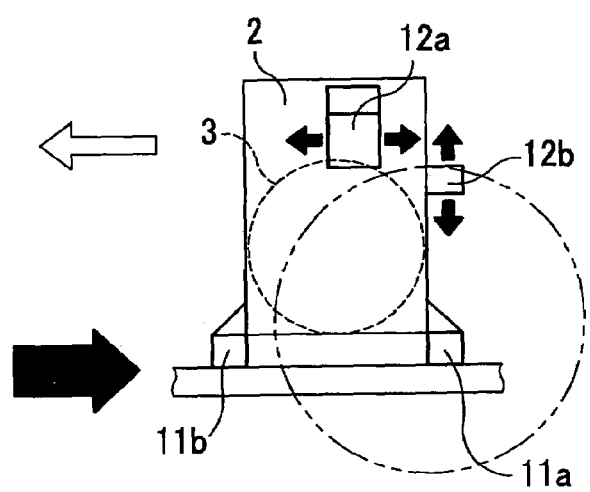
FIG. 5B is a side view illustrating a performance of supporting structure of a vehicle power source related to one embodiment of the invention.

As shown in FIG. 5B, these side engine mount 12a and trans-upper mount 12b enable a relatively small spring to be used and a vibration transmission to the vehicle 21 to be minimized because they work (see a black small arrow mark in FIG. 5B) as stop members which do not primarily support the weight of the engine 2 or as a spring for a control mode of a vibratory force (see a black bold arrow mark in FIG. 5B) which is input into tires from the longitudinal direction such as when passing a rough road.

Then, in the case of a conventional supporting structure of a vehicle power source with only a side engine mount, a vibration in the longitudinal direction results in becoming rather large, in contrast to the supporting structure of the vehicle power source in the embodiment illustrated (see a white arrow mark in FIG. 5B).

Moreover, with the plurality of mount members 1, the height of a center of elasticity as a whole is designed to be set at a higher position than the height of the gravity center 31 in the engine 2.

On one hand, the engine 2 is supported at the sub-frame 22 which are supported through the front mount 11a disposed at the front side of the engine 2, the rear mount 1b disposed at the back of the engine 2, and the trans-lower mount and by the body side frames 23 through the sub-frame support mounts 13.

On the other hand, the engine 2 is supported at the body side frames 23 through the side engine mount 12a and trans-upper mount 12b disposed at the right and left sides of the engine 2, respectively.

Here as described above, on one hand, the height of the center of elasticity, which is composed of the front mount 11a, rear mount 11b, and trans-lower mount, is set at a lower position than the height of the gravity center 31 in the engine 2.

On the other hand, the height of the center of elasticity, which is composed of the side engine mount 12a and trans-upper mount 12b is set at a higher position than the height of the gravity center 31 in the engine 2.

Thus, the height of the center of elasticity as a whole in the plurality of mount members 1 which are composed of the front mount 11a, rear mount 11b, trans-lower mount, side engine mount 12a, and trans-upper mount 12b is intended to be set at a higher position than the height of the gravity center 31 in the engine 2.

As shown in FIG. 5A, when a vibratory force (see a black bold arrow mark) acting in the lateral directions through a vehicle suspension is applied to the supporting structure, the plurality of mount members 1 allow for converting the vibration characteristics of the engine 2 into a rotational vibration about a center (see a black small arrow mark in FIG. 5A) which is higher than the height of the gravity center 31. In this way, the characteristics of vibration transmissions to the vehicle body 21 can be adapted so that the transmitted vibration can be reduced in both the direction of the vibratory force through the suspension and a vehicle travel direction.

On the other hand, in a conventional supporting structure, of which a center of elasticity as a whole is set to be lower than the height of gravity center of an engine, a vibration in the lateral direction will be rather large, in contrast to the supporting structure of the vehicle power source according to the illustrated embodiment (see a white arrow mark in FIG. 5A).

As described above, such the supporting structure results in the elimination of vibration feelings in the longitudinal direction as well as in the lateral direction of the vehicle body 21 because the height of the center of elasticity is designed to consist of the primary weight sharing mount members 11 and secondary weight sharing mount members 12, which are the plurality of the mount members 1, is set at a higher position than the height of the gravity center 31 in the engine 2.

Accordingly, the supporting structure enables a vibration isolation effect and a drive-safety/ride-quality feeling with a sense of unity between the power source and vehicle body to be surely and sufficiently obtained.

What is claimed is:

1. A supporting structure of a vehicle power source comprising:
    a plurality of mount members having elasticity through which a power source is elastically mounted on a vehicle body, said power source comprises an engine and a transmission;
    first mount members for primarily sharing the weight of the power source and at least one of the first mount members, which is supported by said vehicle body at a first height lower than the height of a gravity center of said power source, is attached to a sub-frame; and
    second mount members for secondarily sharing the weight of the power source and the second mount members, which have a spring effect in at least one of longitudinal and lateral directions of said vehicle body, are attached to the vehicle body at a second height higher than the gravity center of said power source,
    said first members comprising
        a front mount disposed at a front side of said engine and
        a rear mount disposed at a back side of the engine,
    said second members comprising
        a side engine mount disposed at an end opposite to said transmission and
        a trans-upper mount disposed on the transmission;
    wherein the height of a center of elasticity of the supporting structure, defined by the first and second mount members, is set to be higher than the gravity center of said power source.

2. The supporting structure of a vehicle power source according to claim 1, wherein said spring effect of said second members is adapted to have a lower spring constant in a vertical direction than one of longitudinal and lateral directions.

3. The supporting structure of a vehicle power source according to claim 1, wherein said sub-frame is supported under body side frames through sub-frame support mounts comprising bolts and buffer members.

* * * * *